(12) United States Patent
Butler et al.

(10) Patent No.: US 11,137,174 B2
(45) Date of Patent: Oct. 5, 2021

(54) ABSORPTION CHILLER

(71) Applicant: CHILLTECHNOLOGIES LIMITED, Bournemouth (GB)

(72) Inventors: Paul Butler, Bournemouth (GB); Michael Keane, Bournemouth (GB)

(73) Assignee: CHILLTECHNOLOGIES LIMITED, Bournemouth (GB)

( * ) Notice: Subject to any disclaimer, the term of this patent is extended or adjusted under 35 U.S.C. 154(b) by 0 days.

(21) Appl. No.: 15/999,620

(22) PCT Filed: Feb. 20, 2017

(86) PCT No.: PCT/GB2017/050433
§ 371 (c)(1),
(2) Date: Aug. 20, 2018

(87) PCT Pub. No.: WO2017/141058
PCT Pub. Date: Aug. 24, 2017

(65) Prior Publication Data
US 2019/0154312 A1 May 23, 2019

(30) Foreign Application Priority Data
Feb. 18, 2016 (GB) .................................. 1602886

(51) Int. Cl.
*F25B 15/04* (2006.01)
*F25B 27/02* (2006.01)
(Continued)

(52) U.S. Cl.
CPC ................ *F25B 15/04* (2013.01); *F25B 6/04* (2013.01); *F25B 15/06* (2013.01); *F25B 17/02* (2013.01);
(Continued)

(58) Field of Classification Search
CPC .......... F25B 15/04; F25B 17/02; F25B 15/06; F25B 27/02; F25B 15/00; Y02A 30/274
See application file for complete search history.

(56) References Cited

U.S. PATENT DOCUMENTS 2,061,606 A * 11/1936 Zellhoefer .............. F25B 15/02
62/148
3,279,211 A * 10/1966 Merrick .................. F25B 15/04
62/476
(Continued)

FOREIGN PATENT DOCUMENTS

EP          0 899 521      3/1999
GB           298575       10/1929
(Continued)

OTHER PUBLICATIONS

International Search Report dated Jun. 27, 2017 issued in PCT International Patent Application No. PCT/GB2017/050433, 5 pp.

*Primary Examiner* — Kun Kai Ma
(74) *Attorney, Agent, or Firm* — Nixon & Vanderhye P.C.

(57) ABSTRACT

An absorption chiller includes a boiler with a vessel for storing a working fluid and a heat source configured to heat the working fluid. A first device is configured to cool the working fluid, and a second device is configured to cool the working fluid. A flow path is arranged to enable the working fluid to flow from the boiler through the first device, through the second device and back to the boiler. A first waste heat source is generated by the first device when cooling the working fluid. The first waste heat source is configured to heat the working fluid along the flow path after exiting the second device and prior to re-entering the boiler.

12 Claims, 4 Drawing Sheets

(51) Int. Cl.
*F25B 6/04* (2006.01)
*F25B 15/06* (2006.01)
*F25B 17/02* (2006.01)

(52) U.S. Cl.
CPC ............ *F25B 27/02* (2013.01); *Y02A 30/274* (2018.01); *Y02B 30/625* (2013.01)

(56) References Cited

U.S. PATENT DOCUMENTS

| | | | | |
|---|---|---|---|---|
| 3,638,452 | A * | 2/1972 | Kruggel | F25B 15/02 62/485 |
| 4,246,761 | A * | 1/1981 | Phillips | F25B 15/00 62/148 |
| 4,691,528 | A * | 9/1987 | Tongu | F25B 15/008 62/238.3 |
| 4,691,532 | A * | 9/1987 | Reid | C09K 5/047 62/476 |
| 4,972,679 | A * | 11/1990 | Petty | C09K 5/047 62/238.3 |
| 5,490,393 | A * | 2/1996 | Fuesting | F25B 15/02 62/101 |
| 5,600,967 | A * | 2/1997 | Meckler | F25B 15/008 62/476 |
| 5,943,874 | A * | 8/1999 | Maeda | F24F 3/1423 62/238.3 |
| 6,332,328 | B1 * | 12/2001 | Bangheri | F25B 49/043 62/141 |
| 6,357,254 | B1 * | 3/2002 | Xia | F25B 15/008 62/476 |
| 6,631,624 | B1 * | 10/2003 | Kirol | F25B 25/005 62/324.2 |
| 6,705,111 | B1 * | 3/2004 | Rockenfeller | F04B 43/067 62/476 |
| 7,347,057 | B1 * | 3/2008 | Garrabrant | F25B 49/043 62/148 |
| 7,814,764 | B1 * | 10/2010 | Heater | F24F 1/04 62/476 |
| 2001/0020367 | A1 * | 9/2001 | Funaba | F23M 9/10 62/238.3 |
| 2002/0053214 | A1 * | 5/2002 | Melendez-Gonzalez | F24F 5/0046 62/235.1 |
| 2003/0029188 | A1 * | 2/2003 | Inoue | F25B 15/008 62/497 |
| 2003/0041608 | A1 * | 3/2003 | Gonzalez-Cruz | F25B 27/007 62/235.1 |
| 2010/0229594 | A1 * | 9/2010 | Erickson | F25B 15/02 62/476 |
| 2012/0285189 | A1 * | 11/2012 | Takeda | F01K 3/24 62/235.1 |
| 2014/0026602 | A1 | 1/2014 | Yabase et al. | |
| 2015/0338140 | A1 * | 11/2015 | Vandermeulen | F24F 3/147 62/238.3 |
| 2016/0298615 | A1 * | 10/2016 | Williams | F04B 19/24 |

FOREIGN PATENT DOCUMENTS

| | | |
|---|---|---|
| JP | 2000-55496 | 2/2000 |
| JP | 2015-222147 | 12/2015 |

* cited by examiner

ABSORPTION CHILLER

This application is the U.S. national phase of International Application No. PCT/GB2017/050433 filed Feb. 20, 2017 which designated the U.S. and claims priority to Great Britain Patent Application No. 1602886.2 filed Feb. 18, 2016, the entire contents of each of which are hereby incorporated by reference.

FIELD OF THE INVENTION

The present invention relates to an absorption chiller.

BACKGROUND OF THE INVENTION

Absorption chillers use heat to drive a refrigeration cycle of a working fluid. Absorption chillers typically use an ammonia-water solution as the working fluid in their systems and cycle the working fluid between a boiler, a condenser, an evaporator and an absorber and back to the boiler by means of a solution pump.

The cooling effect produced by the absorption chiller is based on the evaporation of the working fluid at very low pressure. However, the use of a heat source, typically an exhaust gas or gas powered heat source, to produce a cooling effect results in a lot of waste heat and results in a poor efficiency of the overall system when compared to other types of chillers.

The present application seeks to overcome or at least mitigate the problems associated with the prior art.

SUMMARY OF THE INVENTION

A first aspect of the invention provides an absorption chiller comprising: a boiler comprising a vessel for storing a working fluid and a primary heat source configured to heat the working fluid; a first device configured to cool the working fluid; a second device configured to cool the working fluid; and a flow path arranged to enable the working fluid to flow from the boiler through the first device, through the second device and back to the boiler; wherein the first device forms a first waste heat source configured for heating the working fluid along the flow path after exiting the second device and prior to re-entering the boiler.

Advantageously, this arrangement enables waste heat from the system to heat up the working fluid prior to re-entering the boiler. This reduces the amount of energy required by the boiler to heat the working fluid up sufficiently so as to vaporise said working fluid, thus improving the efficiency of the overall system.

The second device may form a second waste heat source configured for heating the working fluid along the flow path after it has been heated by the first waste heat source.

Advantageously, this arrangement provides a two-stage heating of the working fluid prior to the working fluid re-entering the boiler thus reducing the amount of energy required by the boiler to heat the working fluid to the required temperature. Advantageously, this utilises the waste energy of the second device that is generated while cooling the working fluid during a first part of the absorption chiller process.

The working fluid may be a water solution and the first device may be a condenser configured to condense the water vapour from the working fluid after being evaporated by the boiler.

The condenser may be a heat exchanger.

Advantageously, the heat that is used by the reflux unit to reduce the water content of the working fluid is utilised that would otherwise be wasted.

The second device may be a heat exchanger, e.g. a radiator.

The primary heat source may be a gas burner.

The absorption chiller may include a working fluid pump to convey the working fluid around the flow path, wherein the working fluid pump forms a third waste heat source configured for heating the working fluid prior to re-entering the boiler.

Advantageously, this utilises the waste energy of the working fluid pump that is generated in the hydraulic fluid of the pump while pumping the working fluid around the absorption chiller.

The working fluid pump may be a diaphragm solution pump.

A second aspect of the invention provides for an absorption chiller comprising: a boiler comprising a vessel for storing a working fluid and a primary heat source configured to heat the working fluid; a first device configured to heat the working fluid; a flow path arranged to enable the working fluid to flow from the boiler through the first device and back to the boiler; and a working fluid pump configured to convey the working fluid around the flow path; wherein the working fluid pump forms a first waste heat source configured for heating the working fluid.

Advantageously, this arrangement utilises the waste heat that is generated by absorption chiller to heat the first device. Advantageously, this enables the waste heat that is generated by the working fluid pump from pumping the working fluid around the working fluid flow path to be used to heat the first device.

The first waste heat source may be configured to heat the first device so as to heat the working fluid.

Advantageously, this arrangement utilises heat that is generated by the system to heat components of the absorption chiller, thus reducing the energy required by the absorption chiller to complete the process.

The first waste heat source may be configured to heat the boiler so as to heat the working fluid.

Advantageously, this reduces the amount of energy required to be used by the primary heat source thus increasing the efficiency of the absorption chiller.

The first device may be a heat exchanger, e.g a radiator.

The working fluid pump may be a diaphragm solution pump.

The primary heat source may be a gas burner.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
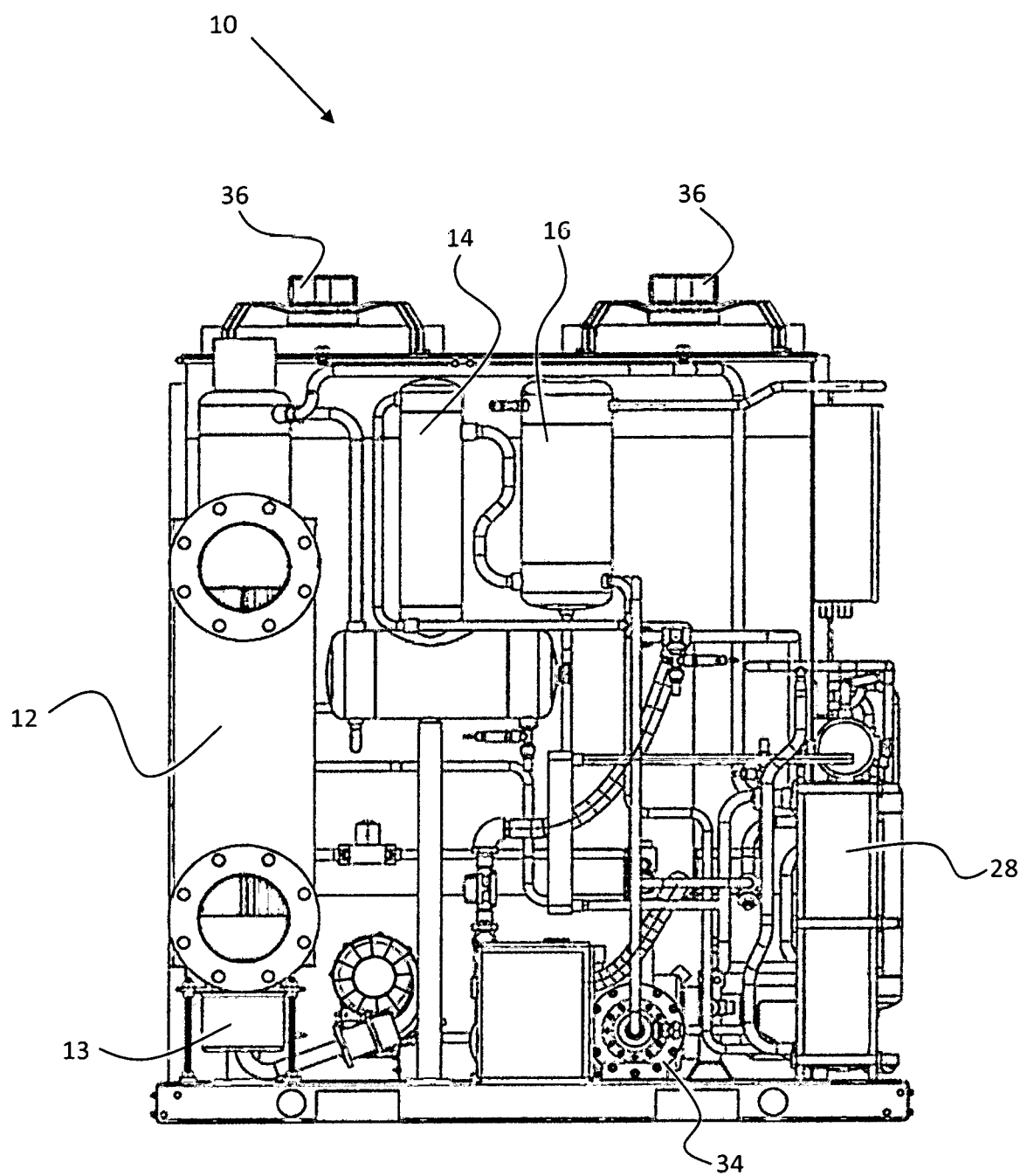
FIG. 1 is a front view of the absorption chiller according to an employment of the present invention.
Figure 2:
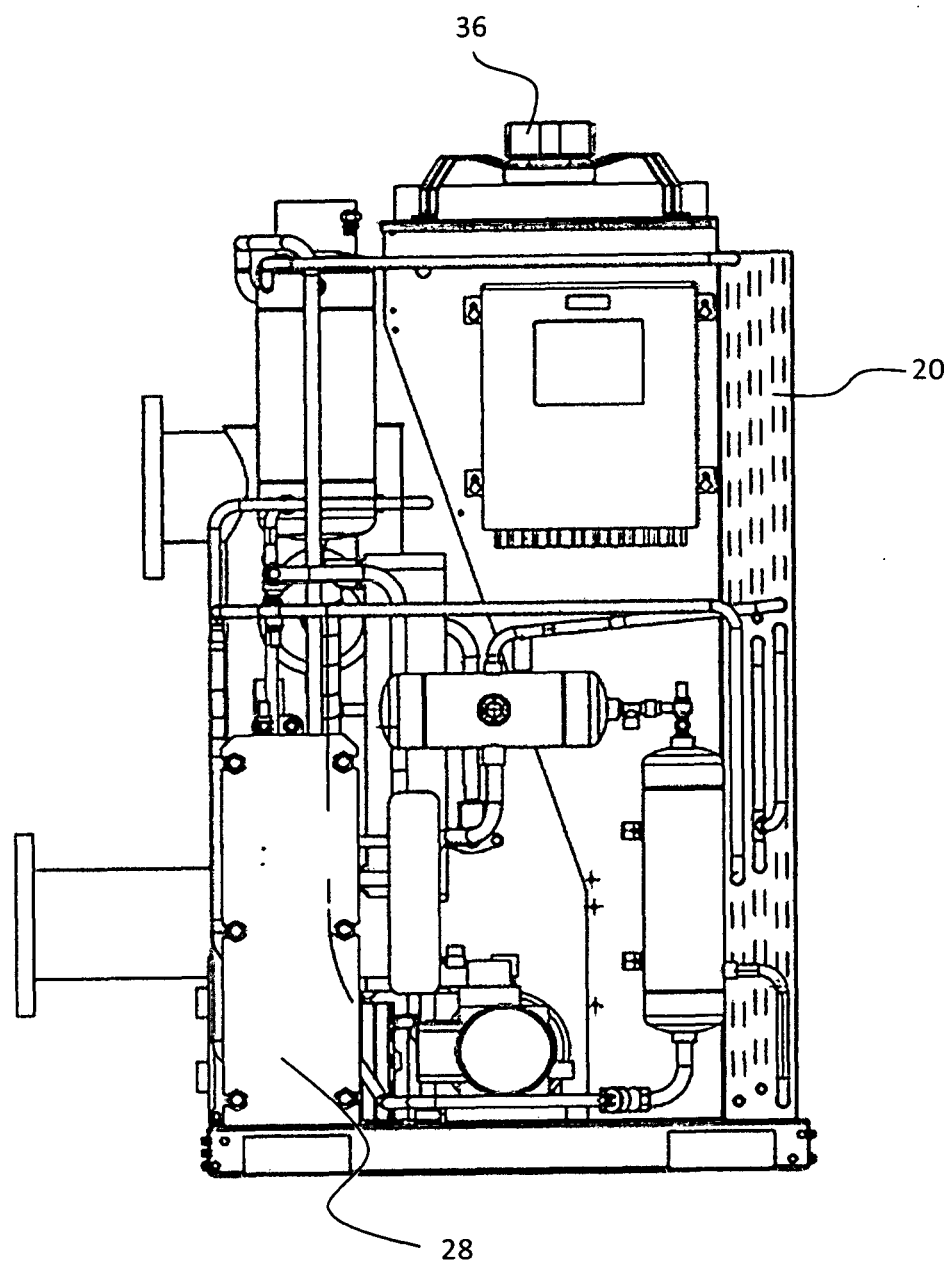
FIG. 2 is a side view of the absorption chiller of FIG. 1.
Figure 3:
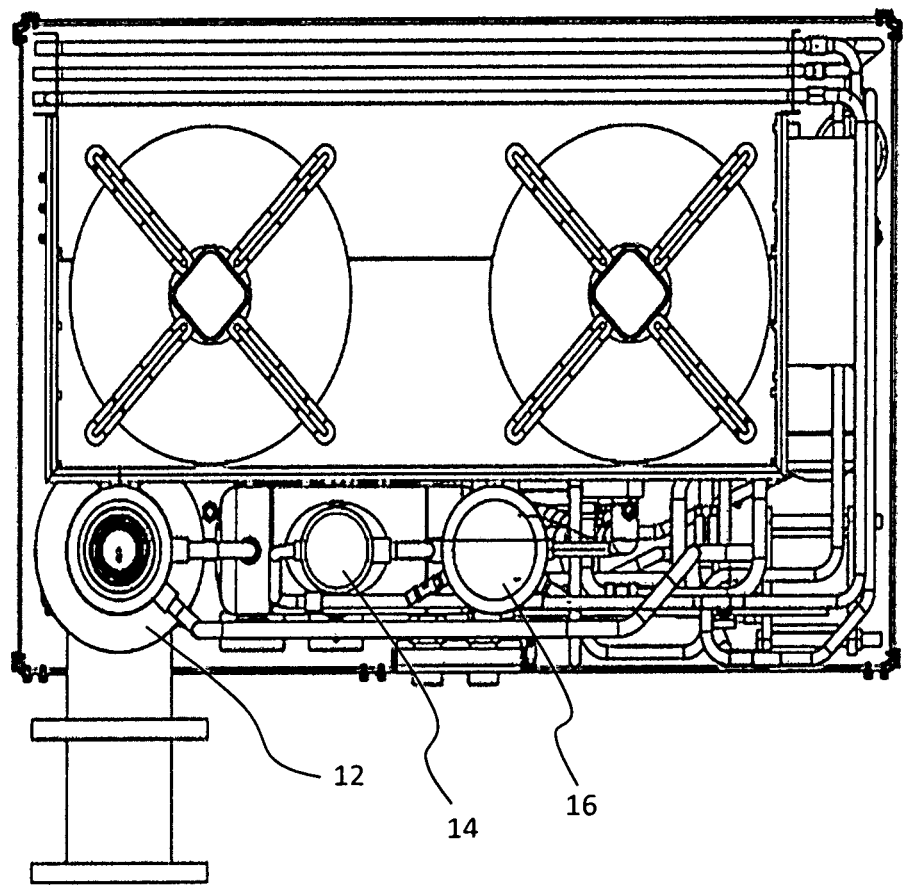
FIG. 3 is a plan view of the absorption chiller of FIG. 1.

Referring to FIGS. 1 to 4, an absorption chiller is illustrated generally at 10. The absorption chiller 10 comprises a boiler 12 which includes a vessel (not shown) for storing a working fluid therein. The boiler 12 also includes a primary heat source 13, for heating the working fluid stored in the vessel of the boiler 12. In this embodiment, the primary heat source is a gas burner. However, in alternative embodiments the primary heat source may be provided by waste exhaust gases or the absorption chiller may be heated by both the gas burner and the waste exhaust gases. The working fluid is transported around a flow path of the absorption chiller 10, where the flow path is divided into a high pressure flow path part and a low pressure flow path part. The working fluid is transported around the high pressure flow path pressure that is generated in the boiler and is transported around the low pressure flow path by means of a working fluid pump, e.g. in the form of a diaphragm solution pump 34. In the illustrated embodiment, the working fluid is a water-ammonia solution, but any suitable working fluid, such as a lithium bromide-water solution or a lithium chloride-water solution may be used. Following evaporation of the working fluid in the boiler 12, the working fluid (now gaseous) flows into a levelling chamber 14 to stabilise the pressure of the working fluid vapour. The working fluid then passes through a first condenser 16 to reduce the amount of water in the working fluid solution and then a second condenser 18. In the condensers 16, 18, air is drawn through coils of the condenser coils resulting in a working fluid that has been cooled and returned to a liquid state.

A heat exchanger 20 is located downstream of the second condenser 18 and the working fluid flows in thermal communication with the heat exchanger 20, so as to further cool the working fluid. The working fluid then passes through a restrictor 22, which causes an expansion of the working fluid, resulting a drop in pressure and temperature of the working fluid.

A further heat exchanger 24 is provided downstream of the restrictor 22. The heat exchanger 24 is maintained at a constant temperature by a chilled water circuit 26, whereby the heat exchanger 24 is configured to cause heating of the working fluid. Due to the low pressure of the working fluid, the raise in temperature results in evaporation of the working fluid.

The absorption chiller 10 further includes two absorbers 28 and 30 which are located downstream of a heat exchanger 23. In this embodiment, absorber 28 is in the form of a plate heat exchanger. However, any suitable heat exchanger may be used, such as a radiator, a fin heat exchanger or a phase change heat exchanger. Internal to absorber 28, the working fluid vapour is mixed with a water rich ammonia solution that works to maximise absorption of the working fluid in the absorbers 28 and 30. Following exiting the absorber 30, the working fluid then flows through a working fluid store 32, which works to provide a constant feed of working fluid to the diaphragm solution pump.

The working fluid is transported around the working fluid low pressure flow path of the absorption chiller 10, by means of the diaphragm solution pump 34, through which the working fluid passes before re-entering the boiler 10 to begin the cycle again.

Figure 4:
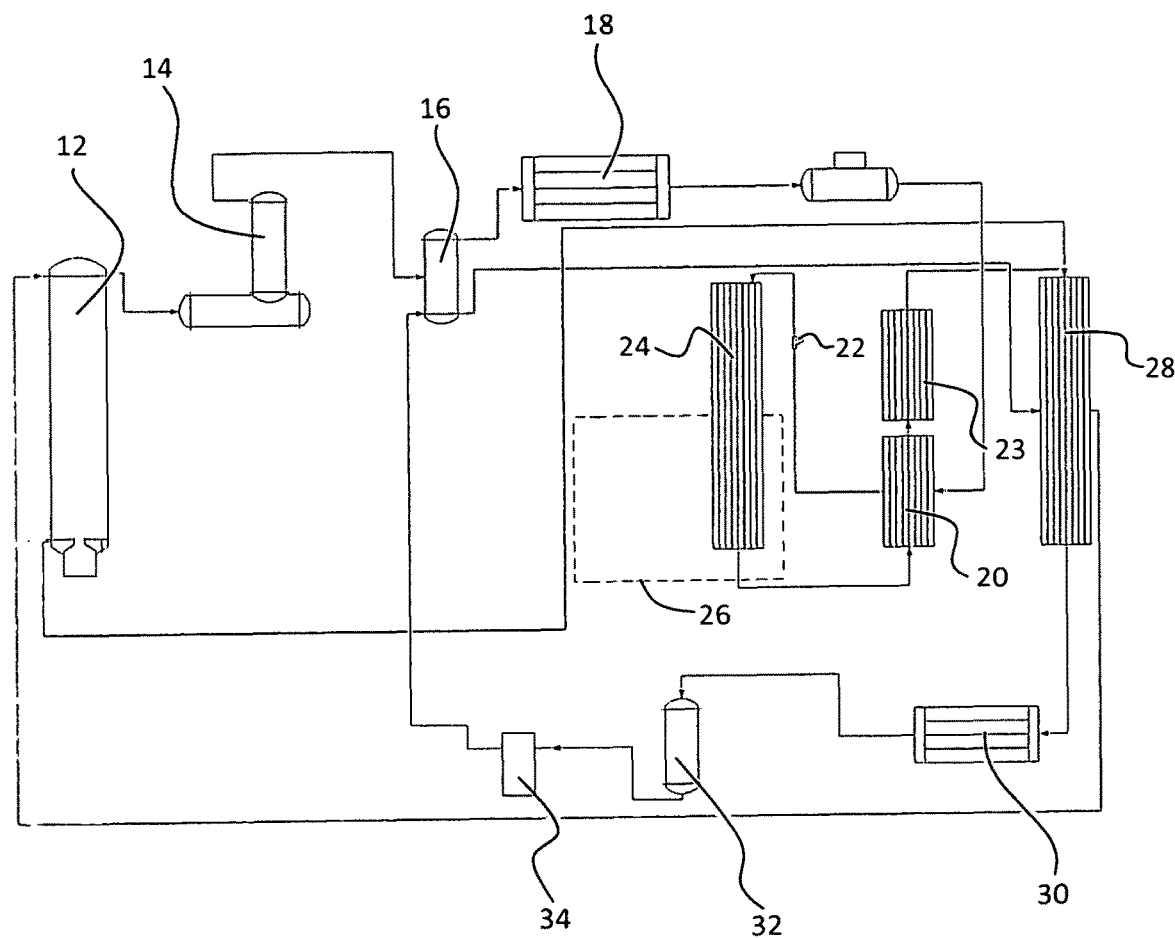
FIG. 4 is a schematic view of the flow path of the absorption chiller of FIG. 1.

Referring specifically to FIG. 4, the flow path of the absorption chiller 10 will now be described. The processes of the flow path of the absorption chiller such as evaporating, condensing, absorbing, heating and cooling of the working fluid have been described with respect to the specific temperatures and pressures of a preferred embodiment of the invention. However, it will be appreciated that the temperatures and pressures involved in such processes may vary to suit different applications.

In use, the working fluid stored in the vessel of the boiler 12 is heated by the primary heat source 13. This heating causes the working fluid to evaporate in the vessel of the boiler 12. The working fluid vapour then flows from the boiler 12 at a temperature of approximately 100° C. and pressure of approximately 20 bar into the levelling chamber 14 so as to reduce the amount of water present in the working fluid vapour. The working fluid vapour then flows into a first condenser 16. In this embodiment, the first condenser 16 is in the form of a coiled heat exchanger and involves the condensation of water vapour the working fluid vapour into liquid form to remove it from the working fluid vapour. Heat is applied to the working fluid and the vapour is chilled to condense the water vapour of the working fluid. This process reduces the amount of water in the working fluid. This results in a working fluid that is 99% ammonia. The first condenser 16 works to cool the working fluid to approximately 70° C. The working fluid then flows into a second condenser 18 which then further cools the working fluid to approximately 45° C. Following this, the working fluid flows through a first heat exchanger 20, which works to cool the working fluid from 45° C. down to 20° C. The waste heat generated by the cooling of the working fluid is radiated away by the heat exchanger and is used to heat the working fluid vapour at a later stage in the working fluid flow path. The working fluid solution then flows through the restrictor 22 which restricts flow to reduce the pressure of the working fluid from 20 bar down to 3 bar. The reduction in the pressure results in expansion of the working fluid which further cools the working fluid from 20° C. down to 7° C. The working fluid then flows in thermal communication with a further heat exchanger 24 located downstream of the restrictor 22. The temperature of the heat exchanger 24 is maintained by a chilled water circuit 26. This results in a temperature of the heat exchanger 24 which works to heat the working fluid vapour from 7° C. up to 13° C. Due to the low pressure of the working fluid, this heating results in evaporation of the working fluid.

The working fluid then flows in thermal communication with the first heat exchanger 20 after exiting the heat exchanger 24. The waste heat generated by the heat exchanger 20 in cooling the working fluid earlier in the working fluid flow path, works to heat the working fluid from 13° C. up to 25° C. In this way, the waste heat generated from cooling working fluid via the heat exchanger 20 can be used to heat the working fluid prior to entering the a heat exchanger 23 and absorbers 28, 30 before returning to the boiler 12, thus reducing the overall energy usage of the absorption chiller 10.

In addition to the heating of the heat exchanger 20 by the cooling of the working fluid, a further heat source is also provided. In pumping the working fluid around the working fluid flow path, the hydraulic pump of the diaphragm solution pump 34 generates heat in the hydraulic fluid used to operate the diaphragm solution pump. The waste heat generated in the hydraulic fluid is used to heat the heat exchanger 23 so as to heat the heat working fluid from 25° C. to 35° C. The combination of heating from the solution pump and from the cooling of the working fluid reduces the need for additional heating sources provided to heat the working fluid. This results in an increase in the overall efficiency of the absorption chiller 10. In alternative embodiments, the waste heat generated by the diaphragm solution pump 34 may be used to heat an additional heat exchanger, rather than the heat exchanger 20. Following flowing through the heat exchanger 23 the working fluid is then mixed with a water rich ammonia solution. In this embodiment, the replenishing working fluid solution is a 10% ammonia 90% water solution held at 132° C. This solution is mixed with the working fluid in the absorber 28. The mixture of the existing working fluid with a water rich solution maximises the absorption of the ammonia vapour of the working fluid into the water so as to be able to begin the process again at a later stage. The working fluid then flows through the absorber 30 at approximately 70° C. which cools the working fluid to a temperature of approximately 40° C. and the ammonia vapour of the working fluid is absorbed into the water rich ammonia solution.

Following flowing through the absorber 30, the working fluid flows into a working fluid solution store 32. In this embodiment, the solution store comprises of 50 to 50 ratio of water to ammonia solution. The working fluid then flows through the diaphragm solution pump 34 at a temperature of 40° C. The diaphragm solution pump 34 increases the pressure of the working fluid from 3 bar up to 20 bar. The diaphragm solution pump 34 flows the working fluid in thermal communication with the waste heat generated by the first condenser 16. The waste heat of the condenser 16 heats the working fluid from 40° C. to 51° C. The working fluid then flows in thermal communication with the absorber 28, where the waste heat generated by the heat exchanger in cooling the working fluid earlier in the flow path heats the working fluid from 51° C. up to 115° C. The working fluid then flows back in to the boiler at a temperature of 115° C. In using this two stage heating process to heat the working fluid from 40° C. to 115° C. prior to re-entering the boiler 12 reduces the use of the primary heat source 13 required to evaporate the working fluid. This results in a reduction of the overall energy usage of the absorption chiller 10, thus increasing its efficiency.

Although the invention has been described above with reference to one or more preferred embodiments, it will be appreciated that various changes or modifications may be made without departing from the scope of the invention as defined in the appended claims. Specifically, it will be appreciated that although the invention has been described with respect to specific temperatures and pressures, any suitable pressures and temperatures may be used without deviating from the scope of the invention.

The invention claimed is:

1. An absorption chiller comprising:
a boiler including a vessel for storing a working fluid and a primary heat source configured for heating the working fluid;
a flow path for transporting the working fluid, wherein the flow path has a first stage in which the working fluid is cooled, and a second stage connected with and downstream of the first stage in which the working fluid is heated;
a condenser configured to cool the working fluid along the first stage of the flow path; and
an absorber configured to cool the working fluid along the first stage of the flow path;
wherein the first and second stages of the flow path are arranged to enable the working fluid to flow from the boiler through the condenser, then through the absorber and back to the boiler;
wherein the condenser and the absorber generate waste heat when cooling the working fluid along the first stage of the flow path so as to form first and second waste heat sources, respectively, and
wherein the second stage of the flow path is arranged such that the working fluid flowing therealong is heated by said first and/or second waste heat sources after the working fluid has exited the absorber and prior to re-entering the boiler.

2. The absorption chiller according to claim 1, wherein the second waste heat source is configured for heating the working fluid after it has been heated by the first waste heat source.

3. The absorption chiller according to claim 1, wherein the working fluid is a water solution, and wherein the condenser is configured to condense water vapour from the working fluid after being evaporated by the boiler.

4. The absorption chiller according to claim 1, wherein the condenser is a heat exchanger.

5. The absorption chiller according to claim 1, wherein the absorber is a radiator.

6. The absorption chiller according to claim 1, wherein the primary heat source is a gas burner.

7. The absorption chiller according to claim 1, further comprising a working fluid pump to convey the working fluid around the flow path, wherein the working fluid pump forms a third waste heat source configured for heating the working fluid along the flow path prior to re-entering the boiler.

8. The absorption chiller according to claim 7, wherein the working fluid pump is a diaphragm solution pump.

9. The absorption chiller according to claim 4, wherein the condenser is in the form of a coiled heat exchanger.

10. The absorption chiller according to claim 1, wherein the absorber is a heat exchanger.

11. The absorption chiller according to claim 10, wherein the absorber is a plate heat exchanger.

12. The absorption chiller according to claim 1, further comprising a restrictor downstream of the condenser that restricts flow to reduce a pressure of the working fluid.

* * * * *